(12) United States Patent
Urbain et al.

(10) Patent No.: US 10,967,545 B2
(45) Date of Patent: Apr. 6, 2021

(54) CALENDER HAVING A ROLL WITH SIDE COLLARS

(71) Applicant: COMPAGNIE GENERALE DES ETABLISSEMENTS MICHELIN, Clermont-Ferrand (FR)

(72) Inventors: Quentin Urbain, Clermont-Ferrand (FR); Sylvain Gouteyron, Clermont-Ferrand (FR); Christophe Egerszegi, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 197 days.

(21) Appl. No.: 16/065,405

(22) PCT Filed: Dec. 20, 2016

(86) PCT No.: PCT/FR2016/053583
§ 371 (c)(1),
(2) Date: Jun. 22, 2018

(87) PCT Pub. No.: WO2017/109391
PCT Pub. Date: Jun. 29, 2017

(65) Prior Publication Data
US 2018/0370089 A1  Dec. 27, 2018

(30) Foreign Application Priority Data
Dec. 23, 2015 (FR) ..................................... 1563242

(51) Int. Cl.
*B29C 43/24* (2006.01)
*B29C 43/50* (2006.01)
(Continued)

(52) U.S. Cl.
CPC .............. *B29C 43/24* (2013.01); *B29C 43/10* (2013.01); *B29C 43/46* (2013.01); *B29C 43/50* (2013.01);
(Continued)

(58) Field of Classification Search
CPC ....................... B29C 43/24–245; B29C 43/22
See application file for complete search history.

(56) References Cited

U.S. PATENT DOCUMENTS 2,358,176 A * 9/1944 MacDonald ............ B29C 43/22
156/437
2,994,913 A 8/1961 Holman
(Continued)

OTHER PUBLICATIONS

International Search Report dated Mar. 28, 2017, issued for PCT/FR2016/053583.
(Continued)

*Primary Examiner* — Matthew J Daniels
*Assistant Examiner* — Andrew L Swanson
(74) *Attorney, Agent, or Firm* — Venable LLP (57) ABSTRACT

A profiling calender includes an intermediate roll, a lower roll, and a pair of intermediate lugs. The intermediate and lower rolls are separated by a distance defining a height of a second profiling nip. The intermediate lugs are situated at ends of the intermediate and lower rolls and include two quarter-circle bearing surfaces that meet at the second profiling nip. Each end of the intermediate roll or each end of the lower roll is equipped with a collar fastened to the roll and positioned between the roll and a quarter-circle bearing surface of a corresponding intermediate lug. The collar enables a radius of the roll to be increased by a height equal to the separation distance in order to improve an appearance of edges of a profiled element produced by the calender.

7 Claims, 5 Drawing Sheets

(51) Int. Cl.
  *B29C 43/10*    (2006.01)
  *B29C 43/46*    (2006.01)
  *B29L 30/00*    (2006.01)

(52) U.S. Cl.
  CPC .. *B29C 2043/464* (2013.01); *B29C 2043/467* (2013.01); *B29L 2030/00* (2013.01); *B29L 2030/001* (2013.01)

(56) References Cited

U.S. PATENT DOCUMENTS

| | | | |
|---|---|---|---|
| 2,998,623 A | | 9/1961 | Lawson et al. |
| 3,891,494 A | | 6/1975 | Hunter |
| 3,969,458 A | * | 7/1976 | Hunter ............... B26D 3/003 |
| | | | 264/154 |
| 5,513,560 A | * | 5/1996 | Downing ............ B23Q 7/048 |
| | | | 100/35 |
| 2014/0035187 A1 | | 2/2014 | Leblanc |
| 2014/0035188 A1 | * | 2/2014 | Leblanc ............ B29C 43/24 |
| | | | 264/175 |
| 2015/0360399 A1 | | 12/2015 | Grosz et al. |
| 2018/0370090 A1 | | 12/2018 | Urbain et al. |

OTHER PUBLICATIONS

Written Opinion dated Jun. 29, 2017, issued for PCT/FR2016/053583 (in French).

\* cited by examiner

CALENDER HAVING A ROLL WITH SIDE COLLARS

BACKGROUND

The invention is based in the field of the manufacture of tire casings, and more generally in the field of the profiling of rubber mixtures.

During the assembly of a blank of a tire casing, there are assembled different components including different rubber portions cut from profiles stored by winding on reels. With the different assembled portions having different functions and different positions in the future casing, the different profiled elements from which they are obtained are produced from different rubber mixtures. Since the blank assembled from these different portions has to undergo a vulcanization step in order to be converted into a tire casing, the rubber mixtures from which these profiled elements are produced are uncured, that is to say unvulcanized, mixtures. Therefore, the mixtures to be profiled are relatively malleable but they also have by contrast a certain degree of stickiness that can prove problematic during profiling and also during the storage of the profiled elements thus produced.

Figure 1:
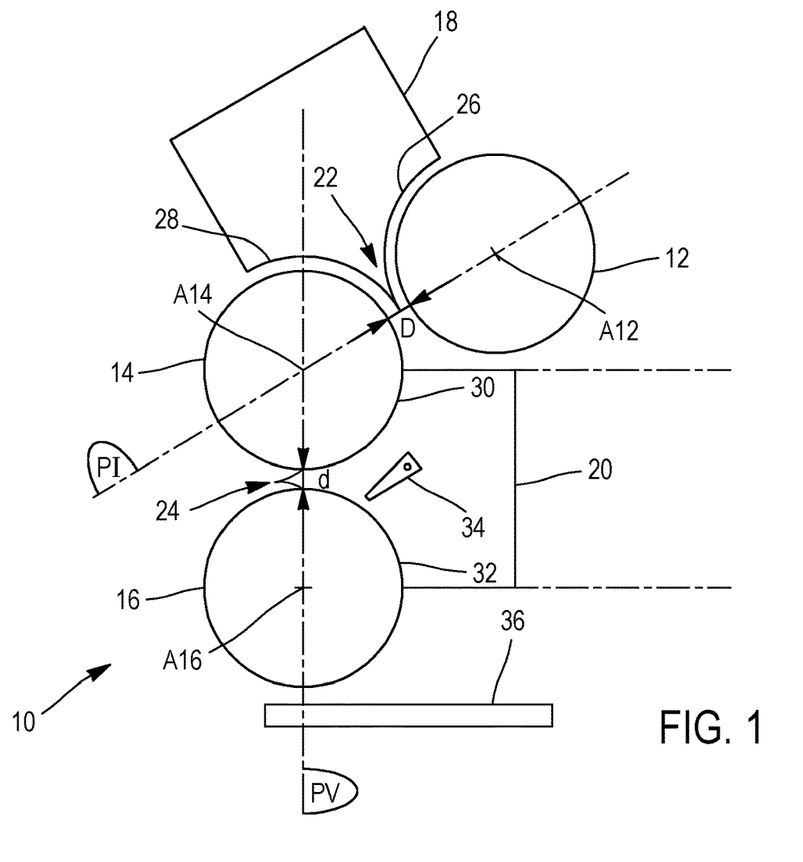
FIG. 1 is a schematic side view of a calender according to the prior art.

If the uncured mixtures are obtained with the aid of different tools including batch and/or continuous mixers and cylinder tools, the operation of profiling these uncured mixtures is generally carried out with the aid of a calender as illustrated in FIG. 1.

According to the prior art, such a calender 10 includes three rotating rolls arranged such that the axis of rotation A12 of the upper roll 12 is situated above the axis of rotation A14 of the intermediate roll 14 and such that the axis of rotation A14 of the intermediate roll is situated above the axis of rotation A16 of the lower roll 16, these three axes of rotation being parallel. More precisely, the axis of rotation A16 of the lower roll 16 and the axis of rotation A14 of the intermediate roll 14 are situated in the same vertical plane PV, whereas the axis of rotation A12 of the upper roll 12 is situated in a plane PI inclined by 60° with respect to the vertical plane PV.

The upper roll 12 and the intermediate roll 14 are separated by a first distance D in the inclined plane PI, this first distance D defining the height of a first profiling nip 22. The intermediate roll 14 and the lower roll 16 are separated by a second distance d in the vertical plane PV, this second distance defining the height of a second profiling nip 24 and this second distance d determining the final thickness of the profiled element. Preferably, this second distance d is less than the first distance D in order to ensure that the mixture completely fills the second nip 24 when implementing the profiling with the calender 10.

In addition to the three rolls, the calender 10 also includes a pair of upper lugs 18 and a pair of intermediate lugs 20. The upper lugs 18 are situated at the transverse ends of the upper 12 and intermediate 14 rolls, and the intermediate lugs 20 are situated at the transverse ends of the intermediate 14 and lower 16 rolls.

In more detail, the upper lugs 18 accompany the mixture to be profiled towards the first nip 22 over the quarter of the circumference of the upper and intermediate rolls that is situated upstream of this first nip 22, and the intermediate lugs 20 accompany the mixture to be profiled towards the second nip 24 over the quarter of the circumference of the intermediate and lower rolls that is situated upstream of this second nip 24. For this purpose, the upper lugs 18 include two quarter-circle bearing surfaces 26,28 meeting at the first profiling nip 22 and respectively following the shape of the outer walls P12,P14 of the upper roll 12 and of the intermediate roll 14, and the intermediate lugs 20 include two quarter-circle bearing surfaces 30,32 meeting beyond the second profiling nip 24 and respectively following the shape of the outer walls P14,P16 of the intermediate roll 14 and of the lower roll 16.

Figure 2:
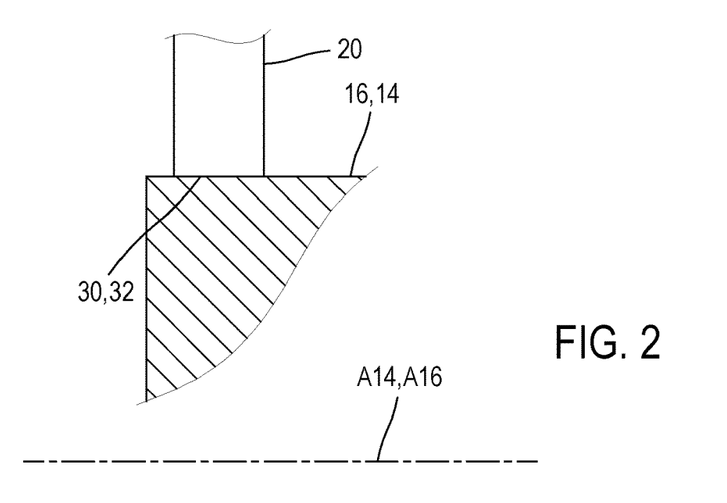
FIG. 2 is a schematic detailed view of the interface between a lug and a roll of a calender according to the prior art.
Figure 3:
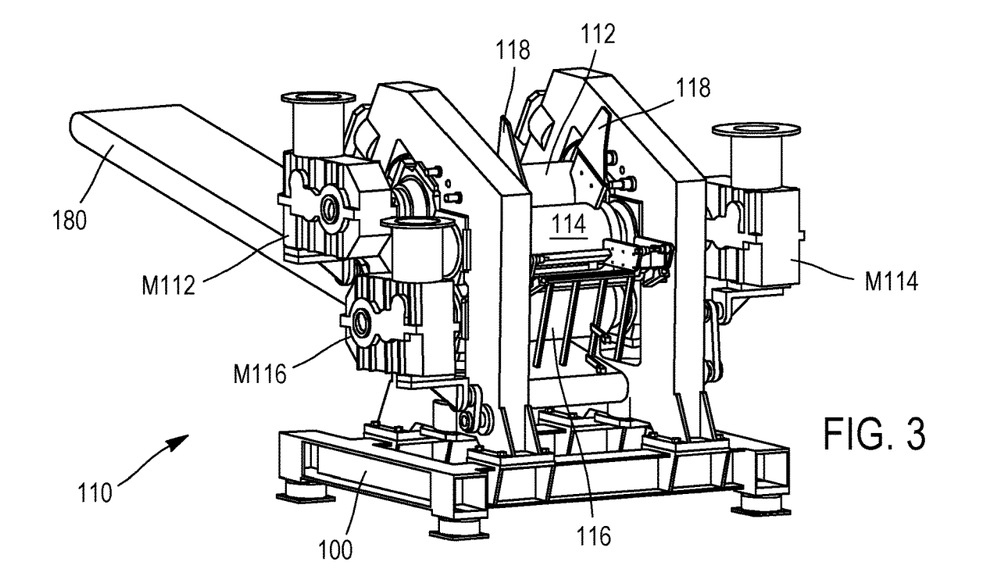
FIG. 3 is a rear perspective view of a calender according to the invention.
Figure 4:
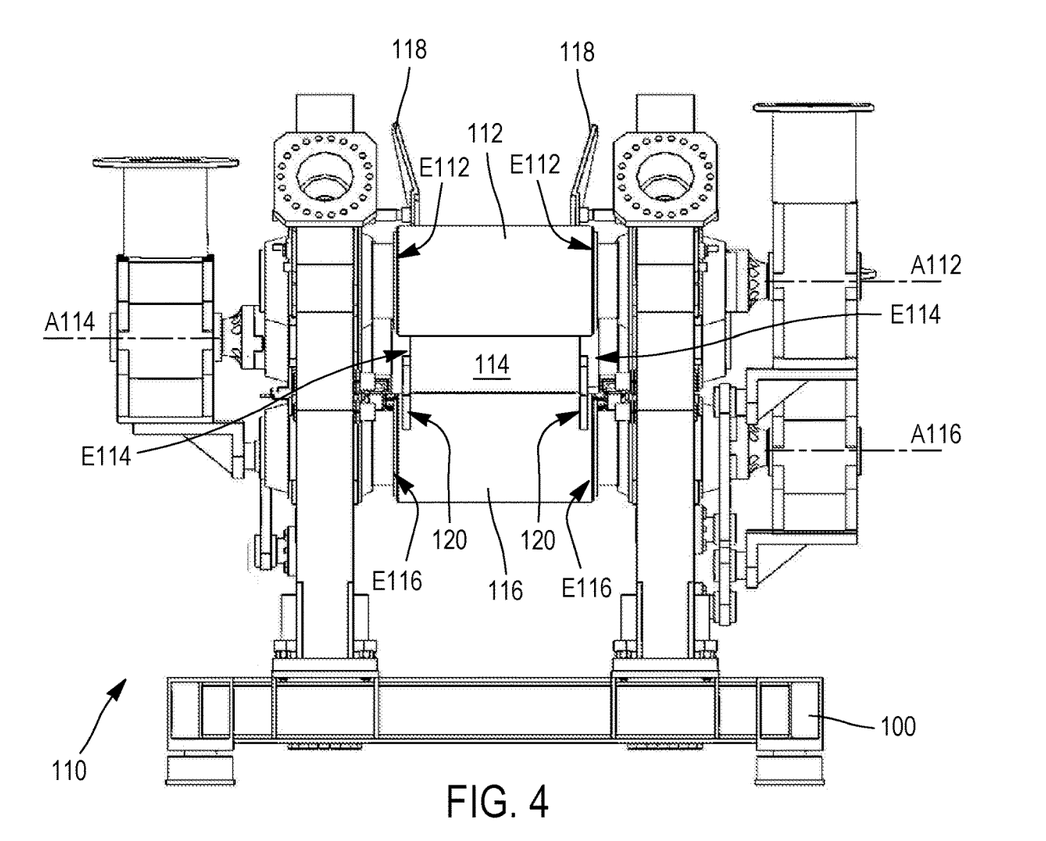
FIG. 4 is a front view of a calender according to the invention without some of its equipment.

Since the upper lugs 18 serve only for guiding the mixture towards the first profiling nip 22 and for the formation of a first mixture bead upstream of this first profiling nip 22, the bearing surfaces 26,28 of these upper lugs are not in contact with the upper 12 and intermediate 14 rolls. Conversely, since the intermediate lugs 20 serve for guiding the mixture towards the second profiling nip 24 and for profiling this mixture on the lateral edges of the profiled element during production, the bearing surfaces 30,32 of these intermediate lugs 20 come into contact, to within the operating clearance, with the intermediate 14 and lower 16 rolls, as is shown by the detailed view in FIG. 2.

With the aim of forming and measuring a second mixture bead upstream of the second profiling nip 24, the calender includes means 34 for retaining the mixture that are positioned upstream of this second profiling nip 24 and between the intermediate lugs 20. These retaining means 34 usually take the form of pressing fingers provided opposite the central part of the second profiling nip 24.

Finally, in order to discharge the profiled mixture leaving the second profiling nip 24, a discharge belt 36 is provided below the lower roll 16.

Although such a calender 10 has made it possible to profile most of the rubber mixtures used up until now in the manufacture of tire casings, difficulties have arisen with more recent rubber mixtures. Specifically, by virtue of their new composition, these recent mixtures are less malleable and the profiled elements produced from these recent mixtures with a calender 10 according to the prior art have appearance defects.

According to a first appearance defect, the lateral edges of the profiled elements leaving the calender 10 are not regular in the thickness and in the width of the profiled elements.

According to another appearance defect, the profiled elements leaving the calender 10 have cohesion defects that are manifested by the appearance of cracks and fissures.

The appearance defects at the lateral edges must be avoided since they impart an irregular cross section on the profiled elements and on the strips cut out from the length of these profiled elements, which causes problems of storage and of quantification of the linear mass of these profiled elements and of the strips cut out from these profiled elements.

The cohesion defects must be avoided since they are liable to cause tearing of the strips cut out from these profiled elements when these strips are stacked and folded on themselves with the aim of storing them and/or transporting them towards a site for manufacturing tire casings, and when these strips are unstacked.

SUMMARY

Hence, the objective of the present invention is to overcome at least one of the disadvantages identified in the prior art and to meet the aforementioned industrial requirements.

Accordingly, the subject of the invention is a calender for profiling a rubber mixture intended for the manufacture of tire casings, the calender including three rotating rolls arranged such that the axis of rotation of the upper roll is situated above the axis of rotation of the intermediate roll and such that the axis of rotation of the intermediate roll is situated above the axis of rotation of the lower roll, these three axes of rotation being parallel, the axis of rotation of the lower roll and the axis of rotation of the intermediate roll being situated in the same vertical plane, the axis of rotation of the upper roll being situated in a plane inclined with respect to the vertical plane, the upper roll and the intermediate roll being separated by a first distance in the inclined plane, this first distance defining the height of a first profiling nip, the intermediate roll and the lower roll being separated by a second distance in the vertical plane, this second distance defining the height of a second profiling nip, the calender having a pair of upper lugs and a pair of intermediate lugs, the upper lugs being situated at the transverse ends of the upper and intermediate rolls, and the intermediate lugs being situated at the transverse ends of the intermediate and lower rolls, the upper lugs having two quarter-circle bearing surfaces meeting at the first profiling nip and respectively following the shape of the outer walls of the upper roll and of the intermediate roll, and the intermediate lugs having two quarter-circle bearing surfaces meeting at the second profiling nip and respectively following the shape of the outer walls of the intermediate roll and of the lower roll. According to the invention, each transverse end of the intermediate roll or of the lower roll is equipped with a collar fastened to this roll and inserted between this roll and the quarter-circle bearing surface of an intermediate lug, and making it possible to increase the radius of the roll by a height equal, to within the operating clearance, to the second distance separating the intermediate roll and the lower roll.

BRIEF DESCRIPTION OF THE DRAWINGS

Other features and advantages of the invention will become apparent from the description that will follow. This description, given by way of non-limiting example, refers to the appended drawings, in which.

DETAILED DESCRIPTION

The invention relates to a calender 110 for profiling a rubber mixture intended for the manufacture of tire casings.

As illustrated in FIGS. 3 to 6, the calender 110 includes three rotating rolls arranged such that the axis of rotation A112 of the upper roll 112 is situated above the axis of rotation A114 of the intermediate roll 114 and such that the axis of rotation A114 of the intermediate roll is situated above the axis of rotation A116 of the lower roll 116. These three axes of rotation A112, A114, A116 are parallel. The axis of rotation A116 of the lower roll 116 and the axis of rotation A114 of the intermediate roll 114 are situated in the same vertical plane PV1. The axis of rotation A112 of the upper roll 112 is situated in a plane PI1 inclined, preferably by 60°, with respect to the vertical plane PV1.

In order to implement the profiling, each roll 112, 114, 116 is driven to rotate by a gear motor M112, M114, M116. During the profiling, the intermediate roll 114 turns in the opposite direction to the upper roll 112, and the lower roll 116 turns in the opposite direction to the intermediate roll 114. The calender 110 includes a frame 100 supporting the rolls 112, 114, 116, the gear motors M112, M114, M116 and all the other equipment and components of the calender 110.

With the aim of profiling the rubber mixture, the upper roll 112 and the intermediate roll 114 are separated by a first distance D1 in the inclined plane PI1, this first distance D1 defining the height of a first profiling nip 122. Still with the aim of profiling the rubber mixture, the intermediate roll 114 and the lower roll 116 are separated by a second distance d1 in the vertical plane PV1, this second distance d1 defining the height of a second profiling nip 124.

Preferably, the second distance d1 is less than the first distance D1 in order to ensure that the mixture completely fills the second nip 124 when implementing the profiling with the calender 110.

In addition to the rolls, the calender 110 has a pair of upper lugs 118 and a pair of intermediate lugs 120. The upper lugs 118 are situated at the transverse ends E112 and E114 of the upper 112 and intermediate 114 rolls, and the intermediate lugs 120 are situated at the transverse ends E114 and E116 of the intermediate 114 and lower 116 rolls.

During the profiling, the upper lugs 118 accompany the rubber mixture towards the first nip 122 over the quarter of the circumference of the upper 112 and intermediate 114 rolls that is situated upstream of this first nip 122, and the intermediate lugs 120 accompany the rubber mixture towards the second nip 124 over the quarter of the circumference of the intermediate 114 and lower 116 rolls that is situated upstream of this second nip 124.

In order to accompany the rubber mixture as far as the first profiling nip 122, the upper lugs 118 include two quarter-circle bearing surfaces 126,128 meeting at the first profiling nip 122 and respectively following the shape of the outer walls P112,P114 of the upper roll 112 and of the intermediate roll 114. The two bearing surfaces 126,128 may or may not come respectively into contact, to within the operating clearance, with the outer walls P112 and P114 of the upper roll 112 and of the intermediate roll 114.

In order to accompany the rubber mixture as far as the second profiling nip 124, the intermediate lugs 120 include two quarter-circle bearing surfaces 130,132 meeting at the second profiling nip 124 and respectively following the shape of the outer walls P114,P116 of the intermediate roll 114 and of the lower roll 116. Preferably, and in order to optimally profile the rubber mixture, the two bearing surfaces 130,132 of each of the two intermediate lugs 120 come into contact, to within the operating clearance, with the outer walls P114,P116 of the intermediate 114 and lower 116 rolls.

In a first variant, the intermediate lugs 120 can be monobloc. However, to facilitate the maintenance of the these intermediate lugs 120 and adapt them easily to rolls or collars of different diameters, each intermediate lug 120 can also be divided into two half-lugs: an upper half-lug 120S supporting the upper quarter-circle bearing surface 130 forming the shape of the outer wall P114 of the intermediate roll 114, and a lower half-lug 120I supporting the lower quarter-circle bearing surface 132 following the shape of the outer wall P116 of the lower roll 116.

Still with the aim of improving the profiling of the rubber mixture, the invention provides that each transverse end E114,E116 of the intermediate roll 114 or of the lower roll 116 is equipped with a collar 140 fastened to this roll. This collar 140 is inserted between this roll 114,116 and the quarter-circle bearing surface 130,132 of an intermediate lug 120. This collar 140 makes it possible to increase the radius of the roll 114,116 by a height H equal, to within the operating clearance, to the second distance d1 separating the intermediate roll 114 and the lower roll 116.

By turning with the cylinder on which they are mounted, the collars 140 make it possible to improve the appearance of the lateral edges of the profiled mixture. More precisely, the collars 140 make it possible to have a non-zero speed at the walls of the mixture during profiling at the second nip 124. Advantageously, this non-zero speed at the walls of the mixture makes it possible to obtain a profiled element with regular lateral edges in its thickness and in its width, including if this profiled element is produced from a mixture not having the ideal malleability to undergo a profiling on a calender with cylinders.

Preferably, it is the lower roll 116 that receives the collars 140 at its transverse ends E114. Thus, a situation is avoided in which the collars 140 have an impact on the height of the first profiling nip 122.

Figure 5:
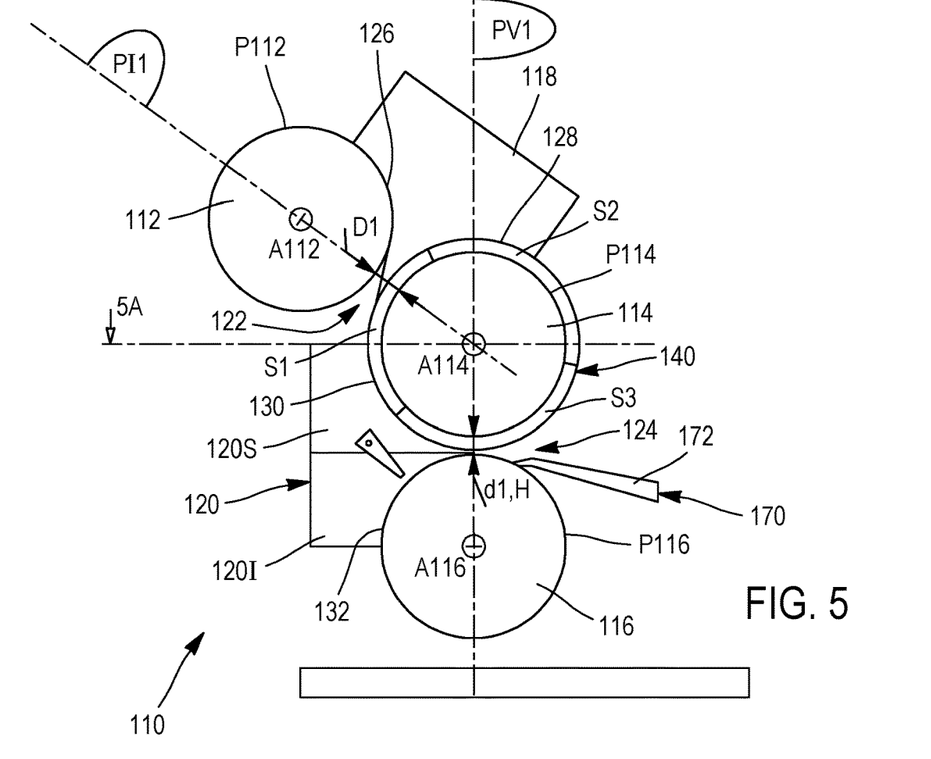
FIG. 5 is a schematic side view of a calender according to the invention with a first variant of mounting the side collars and a first variant of a table for separating the profiled mixture.
Figure 5A:
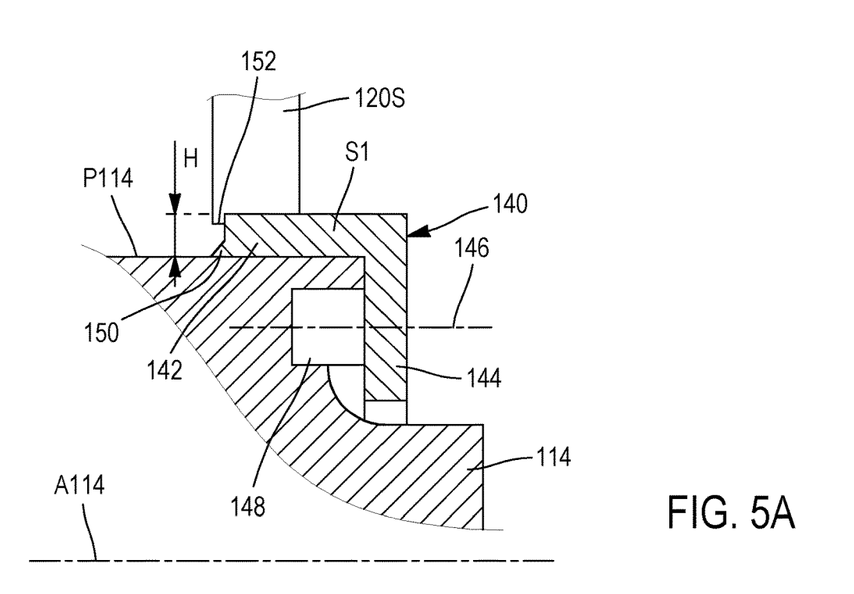
FIG. 5A is a schematic detailed view of FIG. 5 illustrating a first variant of the side collars according to the invention.

In a first preferred variant illustrated by FIGS. 5 and 5A, each collar 140 is an element attached to a cylinder 114,116. To this end, each collar 140 includes three angular sectors S1,S2,S3 attached to the transverse ends E114,E116 of the roll 114,116 on which the collar is mounted. This first variant is advantageous since the three sectors can be changed when they are worn.

By way of example, and as is shown in FIG. 5A, each sector S1,S2,S3 takes the form of an angled bracket having a wing 142 of cylindrical profile inserted between the roll 114,116 and the quarter-circle bearing surface 130,132 of a half-lug 120I,120S, and an annular wing 144 attached to the end E114,E116 of the roll 114,116 via fastening means 146, such as screws, and a sealing ring 148.

Advantageously, the wing 142 of cylindrical profile can include a lip 150 that improves the sealing between the collar 140 and the roll 114,116. In order to improve the sealing between the collar 140 and an intermediate lug 120, the bearing surface 130,132 of a half-lug 120S,120I can include a shoulder 152 that allows the half-lug 120S,120I to jut over the wing 142 of cylindrical profile or allows the wing 142 of cylindrical profile to penetrate into the half-lug 120S,120I.

Figure 6:
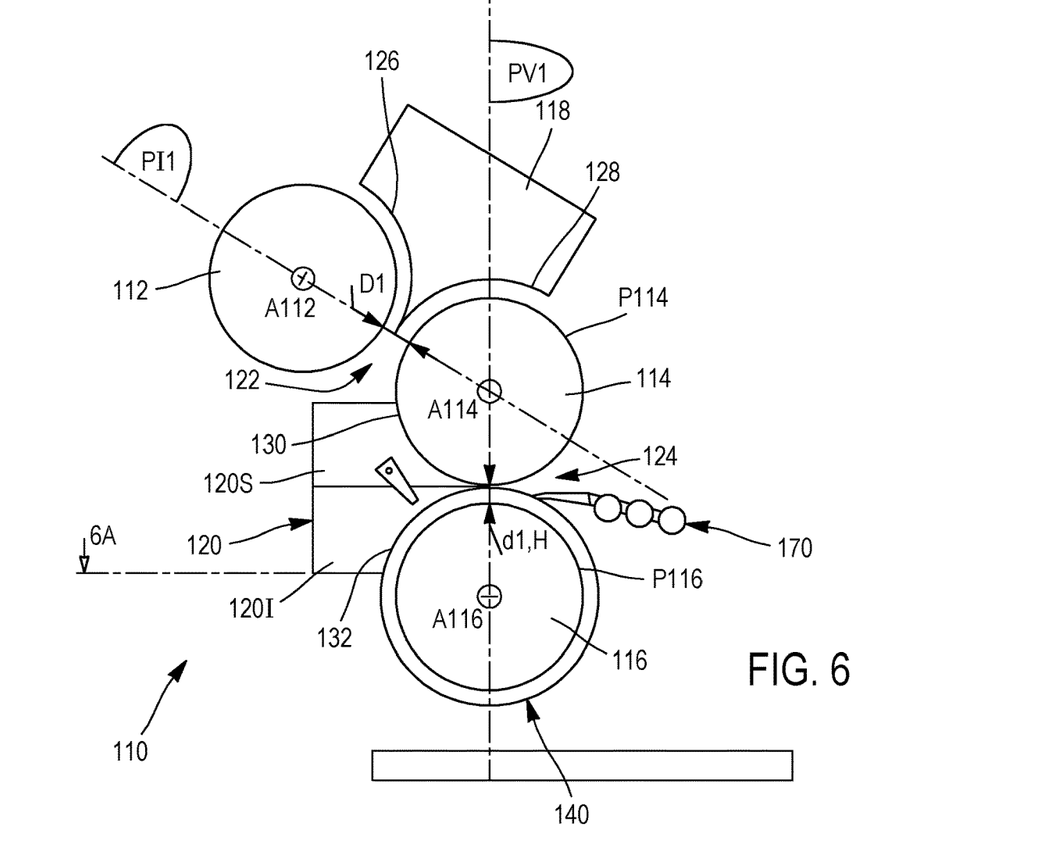
FIG. 6 is a schematic side view of a calender according to the invention with a second variant of mounting the side collars and a second variant of a table for separating the profiled mixture.
Figure 6A:
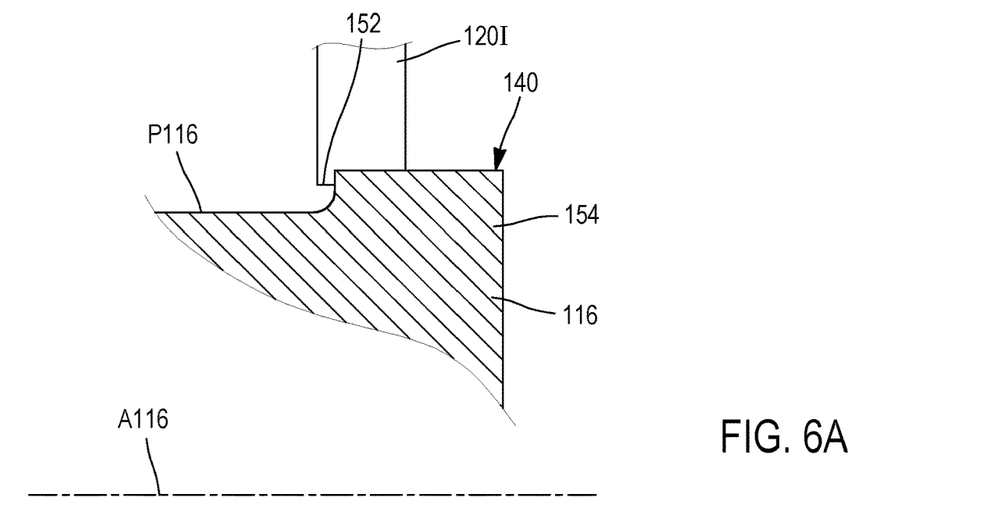
FIG. 6A is a schematic detailed view of FIG. 6 illustrating a second variant of the side collars according to the invention.

In a second variant illustrated by FIGS. 6 and 6A, each collar 140 takes the form of a shoulder 154 produced at an end E114,E116 of the roll 114,116 that the collar equips. In order to improve the sealing between the collar 140 and an intermediate lug 120, the bearing surface 130,132 of a half-lug 120S,120I can include a shoulder 152 that allows the half-lug 120S,120I to jut over the shoulder 154 of the roll 114,116 or allows the shoulder 154 of the roll 114,116 to penetrate into the half-lug 120S,120I.

Still with the aim of improving the sealing between the collar 140 and an intermediate lug 120, each intermediate lug 120 is manufactured from a material that can rub against a collar 140, and therefore against a roll, without leading to premature wear of the collar 140, and therefore of the roll. Preferably, an intermediate lug 120 is made of plastic. The invention means by plastic a material that contains a high polymer as essential ingredient and that can be shaped by creep during its conversion into the finished product. Still preferably, an intermediate lug 120 is manufactured from polyether ether ketone (PEEK), this polymer having the advantage of having a high melting point at 340° C.

Figure 7:
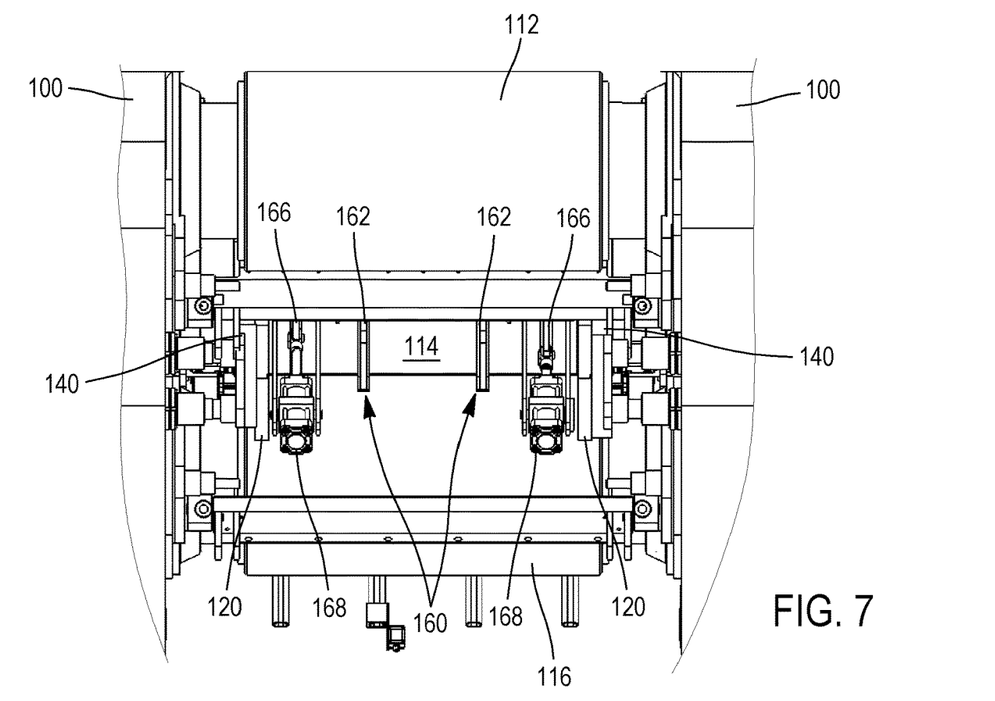
FIG. 7 is a low-angle front view of a calender according to the invention.

With the aim of forming and measuring a second mixture bead upstream of the second profiling nip 124, the calender 110 includes means 160 for retaining the mixture that are positioned upstream of this second profiling nip 124 and between the intermediate lugs 120, as is shown in FIG. 7. These retaining means 160 usually take the form of two pressing fingers 162 provided opposite the central part of the second profiling nip 124.

In order to improve the profiling of the mixture performed by the collars 140 at the second nip 124, the calender 110 includes means 164 for pressing the mixture that are positioned upstream of the second profiling nip 124 and inserted between the central retaining means 160 and each collar 140 equipping an end E114,E116 of a roll 114,116.

Figure 8:
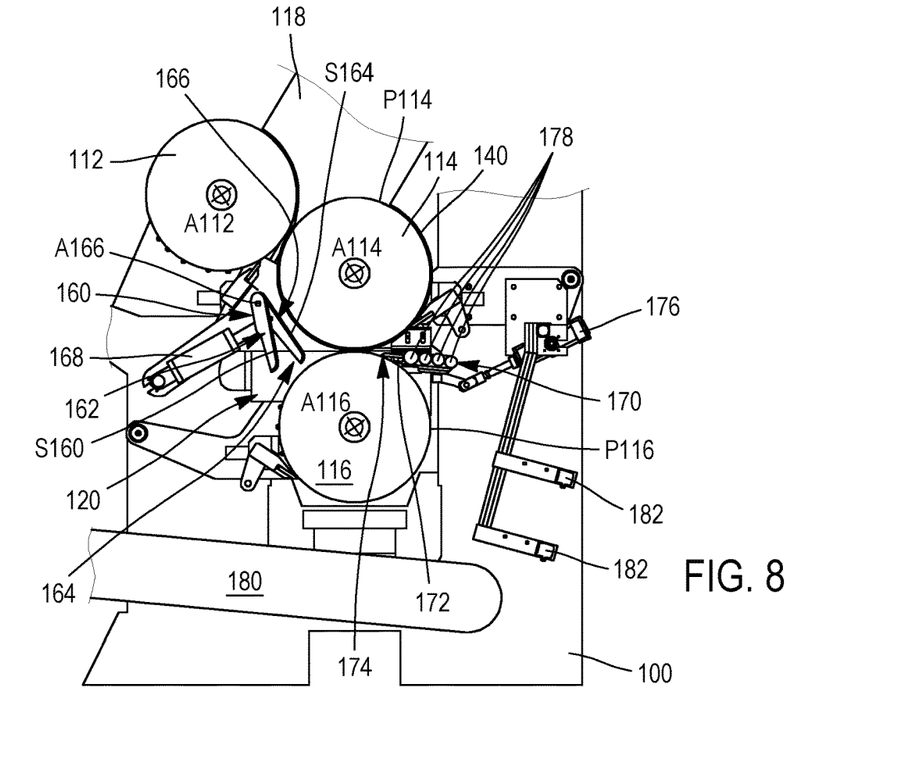
FIG. 8 is a side view of a calender according to the invention without some of its equipment.

The pressing means 164 take the form of fingers 166 of flattened shape that are rotatable about an axis A166 parallel to the axes of rotation A112,A114,A116 of the rolls 112, 114,116 and set in motion by an actuator 168, as is shown in FIG. 8.

During profiling, the pressing surface S164 of the pressing means 164 is closer to the outer wall P114 of the intermediate roll 114 than the retaining surface S160 of the retaining means 160.

The pressing means 164 make it possible to push the mixture along the collars 140 in order to ensure the force-feeding along the collars.

A finger 166 actuated by a jack 168 is provided at the level of each collar 140. A finger 166 can come into contact with a collar 140 or be slightly detached from the collar 140 to facilitate its mounting.

During the profiling, the position of each finger 166 with respect to the intermediate roll 114 can be controlled manually or automatically, and independently or not of the position of the other finger 166.

In association with the collars 140, the pressing means 164 therefore make it possible to improve the appearance of the lateral edges of the profiled mixture.

In order to separate the profiled mixture as early as possible from the lower roll 116 and prevent the profiled mixture from being subjected to tensions liable to lead to cohesion defects, the calender 110 has a table 170 for separating the profiled mixture that is positioned downstream of the second profiling nip 124.

As is shown in FIG. 8, the table 170 includes at least one scraper 172 of which the sharpened end 174 is kept in bearing contact against the outer wall P116 of the lower roll 116 by an actuator 176, such as a jack.

More precisely, the sharpened end 174 of the scraper 172 comes into contact with the outer wall P116 of the lower roll 116 as near as possible to the second profiling nip 124.

In a variant illustrated in FIG. 5, the table 170 has only a scraper 172. Preferably, however, the table 170 includes rolls 178 in the continuation of the scraper 172. These rolls 178 facilitate the discharge and the dropping of the profiled mixture towards the discharge belt 180 situated below the lower roll 116. In order to facilitate the discharge and the dropping of the profiled mixture towards the discharge belt 180, the rolls 178 are arranged so as to form a slope descending towards the discharge belt 180.

Still preferably, and in order to rapidly separate the profiled mixture from the scraper 172 and to avoid a jam, the first roll 178 situated in the continuation of the scraper 172 has a diameter that is larger than the diameter of the other rolls 178.

In order to regulate the speed of the belt 180 for discharging the profiled mixture and to let the profiled mixture swell freely and reduce its speed freely, the calender 110 includes at least one, and preferably two, sensor(s) 182 for measuring the distance between the profiled mixture dropping from the separating table 170 and the outer wall P116 of the lower roll 116.

The separating table 170 therefore makes it possible to improve the cohesion of the profiled mixture on leaving the calender, and therefore to avoid tearing of the strips cut out of this profiled element when these strips are stacked and folded on themselves with the aim of storing them and/or transporting them towards a site for manufacturing tire casings, and when these strips are unstacked.

However, in association with the sensors 182 making it possible to regulate the speed of the discharge belt 180 and with the collars 140 and with the fingers 166, the table 170 also participates in improving the appearance of the lateral edges of the profiled mixture on leaving the calender 110.

The invention claimed is:

1. A calender for profiling a rubber mixture for manufacturing tire casings, the calender comprising:
   three rotating rolls including an upper roll, an intermediate roll, and a lower roll, wherein (a) the three rotating rolls are arranged such that an axis of rotation of the upper roll is situated above an axis of rotation of the intermediate roll and such that the axis of rotation of the intermediate roll is situated above an axis of rotation of the lower roll, (b) the axis of rotation of the upper roll, the axis of rotation of the intermediate roll, and the axis of rotation of the lower roll are parallel, (c) the axis of rotation of the lower roll and the axis of rotation of the intermediate roll are situated in a same vertical plane, (d) the axis of rotation of the upper roll is situated in a plane inclined with respect to the vertical plane, (e) the upper roll and the intermediate roll are separated by a first distance in the inclined plane, the first distance defining a height of a first profiling nip, and (f) the intermediate roll and the lower roll are separated by a second distance in the vertical plane, the second distance defining a height of a second profiling nip;
   a pair of upper lugs and a pair of intermediate lugs, wherein (a) the upper lugs are situated at transverse ends of the upper and intermediate rolls, (b) the intermediate lugs are situated at transverse ends of the intermediate and lower rolls, (c) the upper lugs include two quarter-circle bearing surfaces meeting at the first profiling nip and respectively following a shape of outer walls of the upper roll and of the intermediate roll, and (d) the intermediate lugs include two quarter-circle bearing surfaces meeting at the second profiling nip and respectively following a shape of outer walls of the intermediate roll and of the lower roll,
   wherein, for the intermediate roll or the lower roll, each transverse end of the roll is equipped with a collar fastened to the roll and positioned between the roll and a quarter-circle bearing surface of a corresponding intermediate lug of the pair of intermediate lugs, the collar enabling a radius of the roll to be increased by a height equal, within an operating clearance, to the second distance separating the intermediate roll and the lower roll;
   a retainer structured to retain the rubber mixture, the retainer being positioned upstream of the second profiling nip, opposite a central part of the second profiling nip and between the pair of intermediate lugs; and
   a presser positioned between the retainer and the collar at the transverse end of the roll, the presser being structured to press the rubber mixture and being positioned upstream of the second profiling nip, wherein the presser includes fingers of a flattened shape that are rotatable about an axis parallel to the axis of rotation of the upper roll, the axis of rotation of the intermediate roll, and the axis of rotation of the lower roll, the fingers being set in motion by an actuator.

2. The profiling calender according to claim 1, wherein each transverse end of the lower roll is provided with the collar.

3. The profiling calender according to claim 1, wherein each collar includes three angular sectors attached to a corresponding transverse end of the roll.

4. The profiling calender according to claim 1, wherein each collar has a form of a shoulder positioned at a corresponding transverse end of the roll.

5. The profiling calender according to claim 1, wherein each of the pair of intermediate lugs is a monobloc.

6. The profiling calender according to claim 1, wherein the presser is structured such that, during a profiling operation, a pressing surface of the presser is closer than a retaining surface of the retainer to the outer wall of the intermediate roll.

7. The profiling calender according to claim 1, further comprising a table structured to separate a profiled rubber mixture, the table being positioned downstream of the second profiling nip.

* * * * *